May 15, 1928.
L. HAGEN
1,670,257
SLACK TIGHTENER FOR PULLEY CLOTHESLINES
Filed Nov. 5, 1927
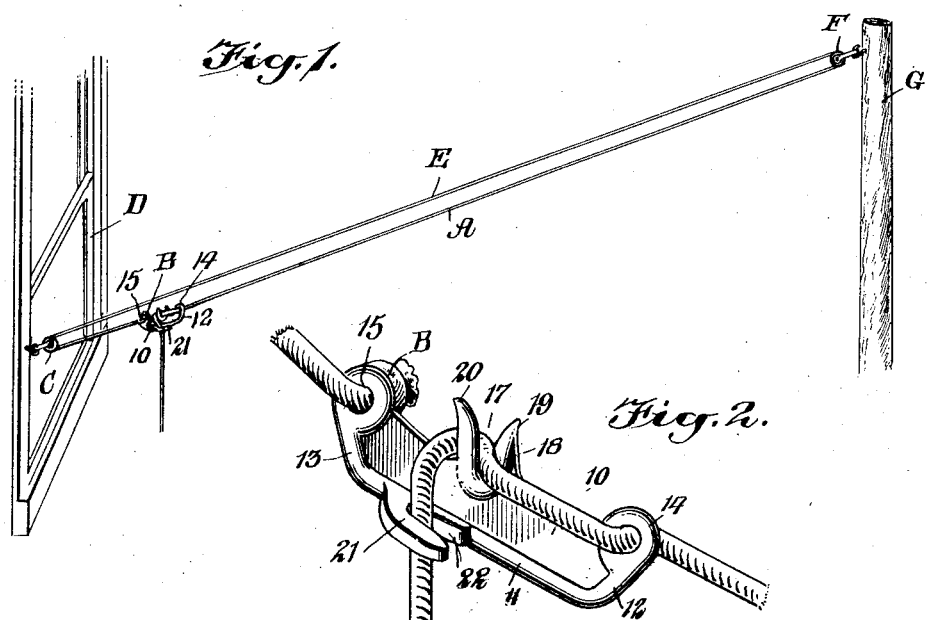
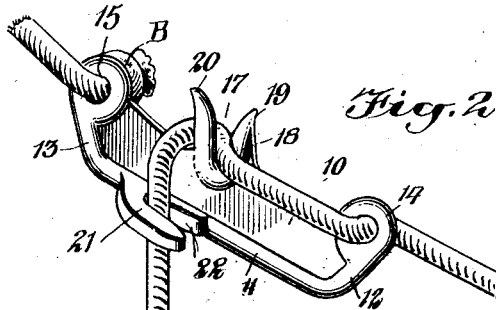
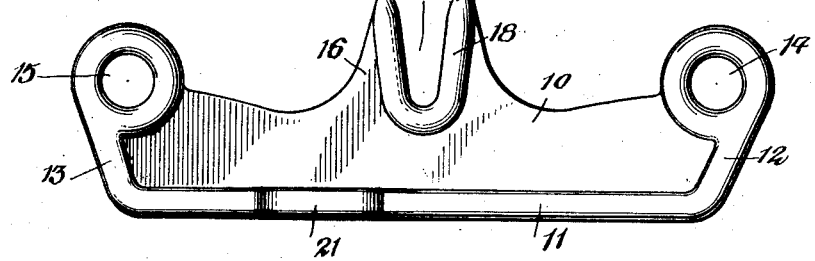
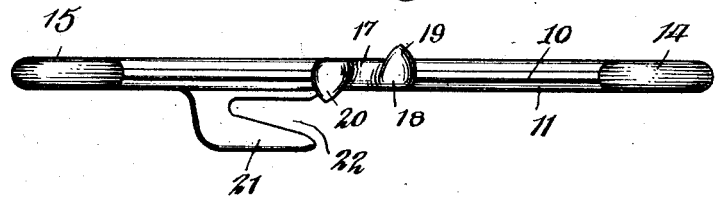
WITNESSES
INVENTOR
Louis Hagen
BY
ATTORNEY Patented May 15, 1928.

1,670,257

UNITED STATES PATENT OFFICE.

LOUIS HAGEN, OF JERSEY CITY, NEW JERSEY.

SLACK TIGHTENER FOR PULLEY CLOTHESLINES.

Application filed November 5, 1927. Serial No. 231,248.

This invention relates to attachments or accessories for clotheslines and has particular reference to an improved slack tightening device for clotheslines of the endless pulley type.

It is a well-known fact that clotheslines of the endless pulley type expand or lengthen in dry weather and shrink or contract in damp weather, thus requiring adjustment to take up the slack when necessary or to allow for contraction due to shrinkage.

The present invention comprehends an improved device for this purpose which is extremely simple in its construction and mode of use, inexpensive to produce, and highly efficient in its purpose.

With the above-recited and other objects in view, reference is had to the following description and accompanying drawings in which there is exhibited one example or embodiment of the invention, while the appended claims define the actual scope of the invention.

In the drawings—

Figure 1 is a diagrammatic perspective view illustrating the device in use;

Fig. 2 is an enlarged perspective view of the device applied;

Fig. 3 is a side view of the device removed from the clothesline;

Fig. 4 is a top plan view thereof.

Referring to the drawings by characters of reference, the device includes a plate or web 10 which is formed at its lower edge with an enlarged bead or rib 11, of substantially circular configuration in cross section, the said bead or rib having upturned ends 12 and 13 which terminate in eyes 14 and 15, respectively. Intermediate its upper edge, the web 10 is provided with an upwardly projecting portion 16 having a V-shaped notch 17, the margin of which notch is reinforced by a rib or bead 18, the free upper terminals 19 and 20 of which are laterally bent in opposite directions. At a point longitudinally between the notched portion of the body 10 and the eye 15, the lower marginal bead or rib 11 is formed with a longitudinally projecting hook 21 which is of gradually reducing width from its juncture with the rib to its outer free end, thereby defining a substantially V-shaped notch 22.

In use, one end of the lower lead A of the clothesline is passed through the eye 15 and provided with a knot B from which point the lower lead is trained around the pulley C which is attached to the window frame D. From this point the upper lead E of the line is trained around the pulley F which is attached to the pole or other support G. The remaining end of the lower lead is trained through the eye 14 and thence engaged first in the V-shaped notch 17 and thence in the V-shaped notch 22 defined by the hook 21. This effectually anchors the latter end of the lower lead and permits of the ready lenghthening or shortening of the clothesline to remove the slack caused in dry weather or to allow for the contraction due to the shrinkage of the line in damp weather.

What is claimed is:

1. A device of the character described, comprising a web plate having a reinforcing rib at one longitudinal edge, said rib having angularly disposed end portions at the end edges of the plate each terminating in an eye, a projection medially of the opposite longitudinal edge of the plate provided with a V-shaped notch and with a reinforcing bead at the edges of the notch, and a hook projecting longitudinally from the reinforcing rib, said hook having confronting divergent sides defining a V-shaped notch.

2. A device of the character described, comprising a web plate having a reinforcing rib at one longitudinal edge, said rib having angularly disposed end portions at the end edges of the plate each terminating in an eye, a projection medially of the opposite longitudinal edge of the plate provided with a V-shaped notch and with a reinforcing bead at the edges of the notch having oppositely laterally bent terminals, and a hook projecting longitudinally from the reinforcing rib, said hook having confronting divergent sides defining a V-shaped notch.

Signed at New York, in the county of New York and State of New York, this 3rd day of November A. D. 1927.

LOUIS HAGEN.